United States Patent
Tegge, Jr.

(10) Patent No.: US 7,593,641 B2
(45) Date of Patent: Sep. 22, 2009

(54) SYSTEM AND METHOD OF FREE-SPACE OPTICAL SATELLITE COMMUNICATIONS

(75) Inventor: Edward H. Tegge, Jr., Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 649 days.

(21) Appl. No.: 10/704,943

(22) Filed: Nov. 10, 2003

(65) Prior Publication Data

US 2005/0100339 A1 May 12, 2005

(51) Int. Cl.
H04B 10/00 (2006.01)

(52) U.S. Cl. ............... 398/125; 398/118; 398/119; 398/121; 398/123; 398/124; 398/128; 398/129; 398/130

(58) Field of Classification Search ......... 398/118–130, 398/202; 359/152, 172; 356/4; 248/346
See application file for complete search history.

(56) References Cited

U.S. PATENT DOCUMENTS

| | | | |
|---|---|---|---|
| 6,181,450 B1 | 1/2001 | Dishman et al. | 359/124 |
| 6,222,658 B1 | 4/2001 | Dishman et al. | 359/172 |
| 6,239,888 B1* | 5/2001 | Willebrand | 398/129 |
| 6,246,498 B1 | 6/2001 | Dishman et al. | 359/123 |
| 6,259,544 B1 | 7/2001 | Dishman et al. | 359/159 |
| 6,271,953 B1 | 8/2001 | Dishman et al. | 359/172 |
| 6,542,277 B2 | 4/2003 | Lange et al. | 359/189 |
| 2002/0051267 A1* | 5/2002 | Nakamura et al. | 359/134 |
| 2002/0064340 A1* | 5/2002 | Fukuchi | 385/24 |
| 2002/0071159 A1 | 6/2002 | Lange et al. | 359/152 |
| 2002/0071164 A1* | 6/2002 | Lange et al. | 359/189 |
| 2002/0131121 A1* | 9/2002 | Jeganathan et al. | 359/152 |
| 2002/0196506 A1* | 12/2002 | Graves et al. | 359/172 |
| 2003/0001073 A1 | 1/2003 | Presby et al. | 250/201.9 |
| 2003/0034432 A1 | 2/2003 | Presby et al. | 250/201.9 |
| 2003/0063401 A1 | 4/2003 | Kurczynski et al. | 359/872 |
| 2003/0067657 A1* | 4/2003 | Dimmler et al. | 359/159 |
| 2003/0081294 A1* | 5/2003 | Lee | 359/172 |
| 2003/0081880 A1 | 5/2003 | Tegge, Jr. et al. | 385/15 |
| 2003/0090765 A1* | 5/2003 | Neff et al. | 359/172 |
| 2004/0086282 A1* | 5/2004 | Graves et al. | 398/202 |
| 2004/0141752 A1* | 7/2004 | Shelton et al. | 398/120 |
| 2004/0208593 A1* | 10/2004 | Bloom | 398/118 |
| 2005/0078295 A1* | 4/2005 | Tansey | 356/4.1 |
| 2006/0038103 A1* | 2/2006 | Helmbrecht | 248/346.01 |

* cited by examiner

Primary Examiner—Ken N Vanderpuye
Assistant Examiner—Li Liu
(74) Attorney, Agent, or Firm—Allen, Dyer, Doppelt, Milbrath & Gilchrist, P.A.

(57) ABSTRACT

A system and method of free-space optical satellite communications includes a ground station and transceiver for transmitting and receiving an optical communications signal. Adaptive optics at the ground station are operative with the transceiver for determining the shape of any distortions in the wavefront of the optical communications signal and compensating at the ground station for the distortions. A satellite includes a transceiver for transmitting and receiving the optical communications signal and includes adaptive optics for determining the shape of any distortions in the waveform of the optical communications signal and compensating at the satellite for the distortions.

17 Claims, 3 Drawing Sheets

SYSTEM AND METHOD OF FREE-SPACE OPTICAL SATELLITE COMMUNICATIONS

FIELD OF THE INVENTION

This invention relates to optical communications, and more particularly, this invention relates to free-space optical communications.

BACKGROUND OF THE INVENTION

Optical communication systems between ground stations and earth orbiting satellites have not been practiced because of the distortion impacts imposed by the atmosphere on the optical beam forming the optical communications signal. Temperature fluctuations, aerosols, water vapor, and air density changes cause changes in the index of refraction to create a multitude of small lenses that refract the light many times by small amounts. Furthermore, suspended particulate matter creates multiple diffractions of the optical beam. When the optical communications signal reaches the optics located on an earth orbiting satellite or ground receiving station, the wavefront of the optical communications signal can be badly distorted in both magnitude and phase. As a result, the optical communications signal spreads, increasing the diameter of the beam, it drifts off-center from the desired point, it no longer can be collected in a small area (i.e. a high speed photodetector or single mode fiber) and the communication data can be lost.

This beam spreading and drifting causes the optical beam forming the optical communications signal to become very large when it reaches the receiving end of the communication link, which reduces the power density of the optical beam. In order for a satellite receiver to collect sufficient signal power and recover the data encoded on the optical communications signal, a combination of very large collection optics are required at the receiver to increase the total collected power and reduce the beam distortion via spatial integration. Furthermore, the transmitted power must be very large to overcome the spreading loss of the beam.

Some proposed free-space optical communication systems accommodate these effects with large optical apertures, electromechanical dynamic range reducers, and high power optical beams. The large optics are larger than what can be reasonably placed on a satellite, and even if mounted in a satellite, would still require high transmitted power levels in the hundreds of watts.

Other free-space optical communication proposals have cascaded Bragg cells and liquid crystals for non-mechanical beam steering in an effort to exert greater control over an optical beam. In this type of system, digital communication signals are multiplexed with other analog communication signals into a single broadband frequency division multiplexed signal. These systems allow non-mechanical beam steering, but are still prone to the optical signal distortion problems noted above.

Some proposals for free-space optical communication systems have used a number of lasers, modulators, and telescope optics in terrestrial applications with off-the-shelf adaptive optics. Some of these are disclosed in published U.S. patent application serial nos. 2003/0001073, 2003/0034432, and 2003/0063401. These systems are directed to a telescope having a deformable mirror that is manipulated using electrostatic forces and mechanically coupling a bound charge layer of dielectric material to at least one surface of the mirror. These free-space optical communication systems appear limited to a terrestrial optical communications.

SUMMARY OF THE INVENTION

It is therefore an object of the present invention to provide a system and method of free-space optical satellite communications that overcomes the drawbacks associated with prior art proposals that are hindered by atmospheric turbulence that distorts optical wavefronts and creates beam wander, signal broadening, and signal fading.

The present invention provides a system and method of free-space optical satellite communications, which overcomes the disadvantages of the prior art. The present invention uses adaptive to reduce and eliminate the distortions imposed on the wavefront of the optical communications signal. The diameter of the optical beam and its optical drift are greatly reduced, allowing a corresponding reduction in the size of the collection optics located in the satellite. Transmitted power levels can also be reduced. The adaptive optics also enable the collection of a received optical communications signal into a single mode fiber which enables the application of common wavelength division multiplexing (WDM), and more particularly, dense wavelength division multiplexing (DWDM) to increase the amount of information that can be transmitted across the communications link.

The present invention allows a reduction in the size, weight and power requirements of the optical communications equipment to satellite compatible values. Prior methods of optical communication require the use of collection optics that exceeds the values, which can be accommodated by satellite. These prior methods also require the use of high power transmitters that exceed the power capability of satellites.

Satellite efficiency is increased because of its ability to pass more data to and from the ground. The present invention preferably uses wavelength division multiplexing (WDM) compatible ground to/from satellite communications, thus increasing communications data rate. The available high communications rate enables elimination of large portions of the satellite located signal processing electronics—data can be sent directly to the ground for signal processing via the high data rate optical communications link. Therefore a significant reduction of the size, weight and power of the electrical processing systems and associated circuitry is enabled by this invention. The system and method of the present invention is also bit rate and protocol insensitive, and, as a result, multiple bit rates/protocols can be simultaneously used thereby allowing additional reduction in the electronics located on the satellite.

The reduced spreading and wandering of the optical beam produces creates a low probability of interception and detection of ground to/from satellite optical communication signals. This enables the use of the communication link in applications where the interception of the signal must be avoided.

In accordance with the present invention, a system and method of free-space optical satellite communications includes a ground station and a transceiver for transmitting and receiving an optical communications signal using associated optics, including any necessary laser for generating an optical beam for transmission. Adaptive optics is operative with the transceiver and determines the shape of any distortions in the wavefront of the optical communications signal and compensates for these distortions. A satellite also includes an optical transceiver and adaptive optics at the satellite for determining the shape of any distortions in the wavefront of the optical communications signal and compensating at the satellite for the distortions.

Each of the adaptive optics of the ground station and satellite includes a wavefront sensor, a deformable mirror, and a circuit operative with the wavefront sensor and adaptive mirror for deforming the adaptive mirror based on distortions determined in the wavefront of the optical communications signal. A wavelength division multiplexer is preferably positioned at each of the ground stations and satellites for wavelength division multiplexing the optical communications signal.

The communication signals may be fed into the present invention in an optical DWDM format via a single mode optical fiber eliminating the need for electrical to optical conversion circuitry. Baseband signals can be converted into optical DWDM signals via electrical to optical converter circuits and an optical multiplexer and then fed into the present invention. A demultiplexer can be positioned at each of the ground station and satellite for demultiplexing the wavelength division multiplex optical communications signal. In another aspect of the present invention, a plurality of receivers are operatively connected to the demultiplexer for receiving demultiplexed signals. Each of the ground station and satellites can be operative for adjusting the transmission of the optical communications signal.

A method aspect of the present invention is also disclosed and comprises the steps of transmitting and/or receiving an optical communications signal between a satellite and ground station. The shape of any distortions in the wavefront of the optical communications signal can be determined and a uniform wavefront restored to the optical communications signal using adaptive optics positioned at the satellite and/or ground station.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
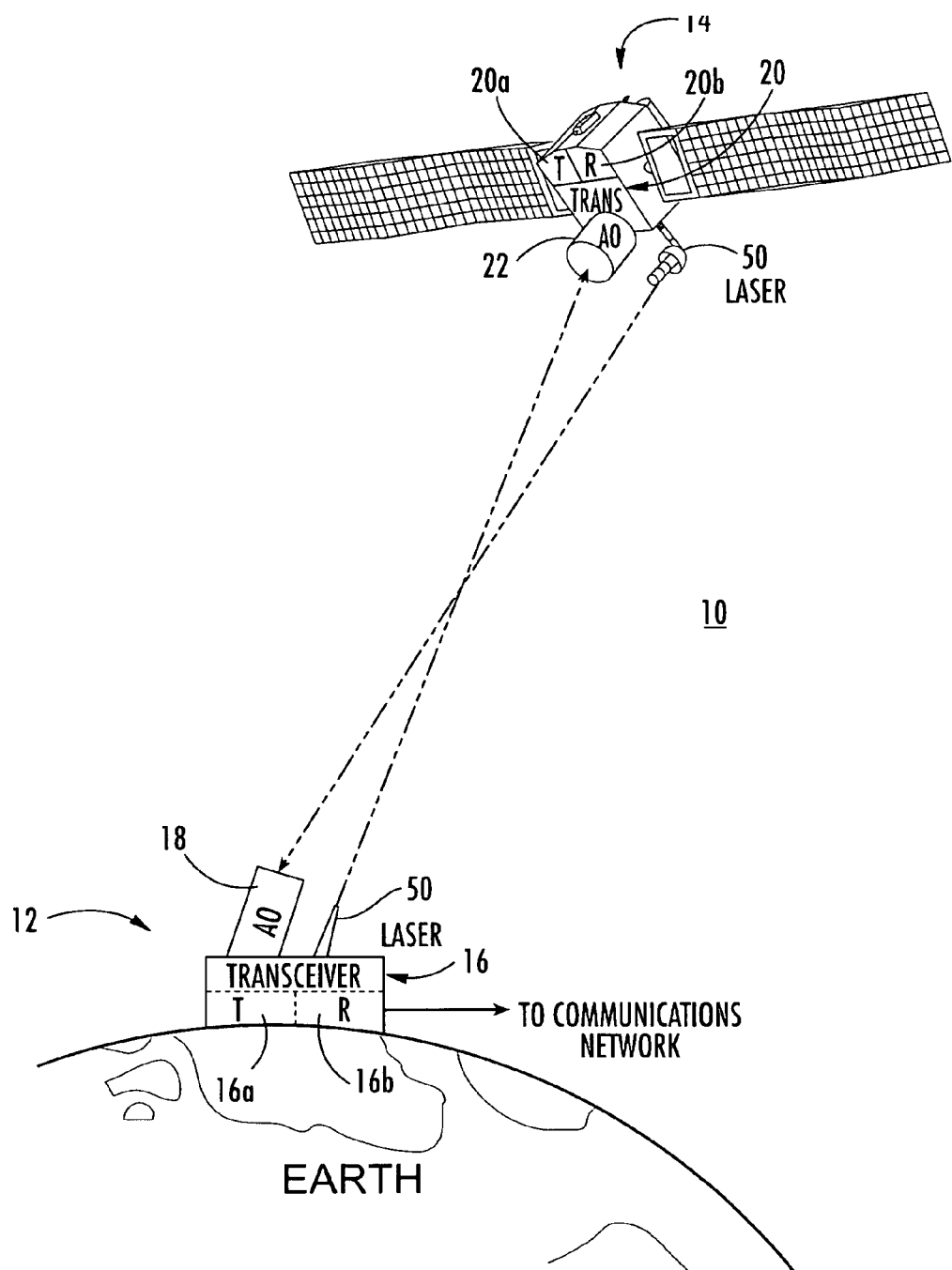
FIG. 1 is a block diagram of the system of the present invention showing adaptive optics used at a ground station and satellite for free-space optical communications in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention overcomes the disadvantages of prior art proposals for free-space optical communication systems between a ground station and satellite. The present invention does not require a satellite to carry on-board large optics, very high power optical transmitters and their associated power supplies. Furthermore, the present invention greatly reduces the amount of signal processing circuits currently required to overcome the low bandwidth satellite to ground communications link. The on-board satellite optics of the present invention can be reasonably placed on a satellite in space. This reduced collection of optics and associated components would not require high transmitted power levels of hundreds of watts normally associated with proposed, prior art optical communication systems. The present invention uses adaptive optics and beneficial wavelength division multiplexing and a single mode fiber as a collector for high speed data transfer in which the distortions imposed on the optical beam in an optical communications signal by the atmosphere are sufficiently reduced or eliminated to allow the diameter and resultant drift of an optical beam to be greatly reduced.

The present invention also allows a corresponding reduction in size of any required beam collection optics within the satellite and reduces the necessary power levels required for transmission. Any received optical communication signal within the satellite can be collected into a single mode fiber to allow the application of wavelength division multiplexing technologies, and more particularly, dense wavelength division multiplexing technologies to increase the amount of information that can be transmitted across the communication link.

In accordance with the present invention, the satellite size, weight and power are reduced by relocating some of the satellite based signal processing circuitry to a ground station. The high speed data transfer using the preferred DWDM allows the transmission of large amounts of data to the ground for processing, instead of using on-board processors, as typically found in most proposed satellite optical communications systems. Thus, more data can be passed to and from the ground to increase satellite efficiency. There is also a low probability of interception and detection on the ground of the satellite communication signals passed to and from the ground. Dense wavelength division multiplexing compatibility is satisfied by using single mode fibers to collect the optical beams. The system and method of the present invention is also bit-rate and protocol insensitive and multiple bit rates/protocols can be used simultaneously. The beam diameters are on the orders of magnitude smaller than other proposed satellite optical communication systems.

Sufficient power margins exist for ground-to-orbit free-space optical communication links as shown by the following table, with values for low earth orbiting (LEO), mid earth orbiting (MEO) and geosynchronous (GEO) satellites.

| | LEO | MEO | GEO | Units |
|---|---|---|---|---|
| Equipment Gain | | | | |
| Tx Power | 40 | 40 | 40 | dBm |
| Rx Sensitivity | −45 | −45 | −45 | dBm |
| Antenna IL | −3 | −3 | −3 | dB |
| Optical Eff | −1 | −1 | −1 | dB |
| Fiber Coupling | −8 | −8 | −8 | dB |
| BW Gain (normalized to 2.5 Gb/s) | 0 | 0 | 0 | dB |
| Adaptive Optics Gain | 0 | 0 | 0 | dB |
| Net Equipment Gain | 73 | 73 | 73 | dB |
| Losses | | | | |
| Spreading Los (0.3 m dia) | −31.5 | −44 | −55 | dB |
| Atmospheric Attn | −1 | −1 | −1 | dB |
| Point Loss | −1 | −1 | −1 | dB |
| Total Loss | −33.5 | −46 | −57 | dB |
| Margins | | | | |
| Fading | −5 | −5 | −5 | dB |

-continued

|  | LEO | MEO | GEO | Units |
|---|---|---|---|---|
| Weather | −1 | −1 | −1 | dB |
| Aging | −3 | −3 | −3 | dB |
| Operating | −3 | −3 | −3 | dB |
| Turbulence | −5 | −5 | −5 | dB |
| Total Margin Gain | −17 | −17 | −17 | dB |
| Excess Margin | 22.5 | 10 | −1 | dB |
| Bit Rate with 0 Excess Margin | 444.6 | 25.0 | 2.0 | Gb/s |
| Min Aperture Dia @ 2.5 Gb/s | 0.06 | 0.2 | 0.3 | m |

FIG. 1 illustrates a fragmentary, but environmental view of the system 10 of the present invention, and showing a ground station 12 and earth orbiting satellite 14, both having a transceiver 16,20 for transmitting and receiving an optical communications signal, and adaptive optics 18,22. Each transceiver 16,20 includes a laser and optical amplifier (not shown) for transmitting an optical beam carrying the required data. Some of the optical components known to those skilled in the art, such as found in commonly assigned U.S. Pat. Nos. 6,181,450 and 6,222,658, the disclosures which are hereby incorporated by reference in their entirety, could be modified for use in the present invention. At the ground station, the adaptive optics 18 are operative with the transceiver 16 and determine the shape of any distortions in the wavefront of the optical communications signal and compensates at the ground station 12 for the distortions. The satellite 14 includes its transceiver 20, which also transmits and receives an optical communications signal and includes adaptive optics 22 for determining the shape of any distortions in the wavefront of the optical communications signal and compensates at the satellite for the distortions. Each transceiver 16,20 includes a respective transmitter 16a, 20a and receiver 16b, 20b.

Figure 2:
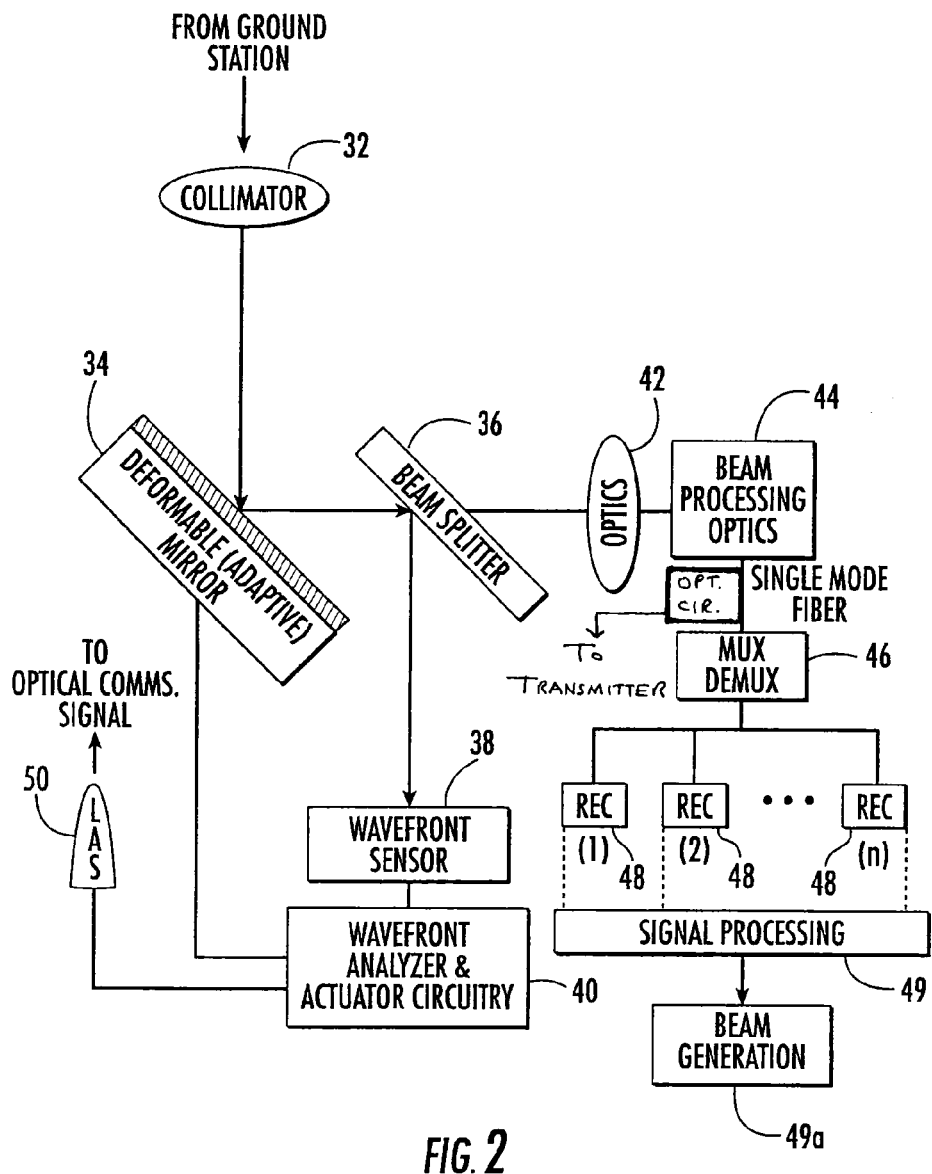
FIG. 2 is a more detailed block diagram showing an example of the type of adaptive optics that can be used on a satellite (and ground station) in accordance with the present invention.

FIG. 2 illustrates a more detailed view of a portion of the transceiver 20 and adaptive optics 22 used in the satellite 14 and showing, for purposes of description, component parts in the receiver chain for receiving an optical communications signal from a ground station. The satellite transmit circuitry of the transceiver could be coupled to another set of adaptive optics and laser for transmitting an optical communications signal to a ground station or use the same adaptive optics employed by the receiver portion of the transceiver, depending on the particular type of communications and satellite design. Adaptive optics in the transmit chain could be used for precompensating a signal. The following description is presented for the receiver chain as an example of the components and processing that can be used in the present invention for both the satellite and ground station.

Typically, the laser generated optical communications signal is processed as a wavelength division multiplexed optical communications signal (WDM) and preferably a dense wavelength division multiplexed optical communications signal (DWDM), in which various optical communications signals are assigned to specific frequencies within a designated frequency band. A single mode optical fiber 30 is preferably used for collecting the optical communication signals for ensuring better control over the DWDM optical communications signals.

Although this description relative to FIG. 2 shows one type of adaptive optics operative with the transceiver in a satellite, it should be understood that different types of adaptive optics could be used in telescope objective lens 32 is positioned on the satellite and receives the free-space optical communications signal transmitted from a ground station 12. The light beam is focused and aligned for presentation onto a deformable (adaptive) mirror 34. After reflection from the deformable mirror 34, the optical beam passes into a beam splitter 36, which could be a dichroic beam splitter in one preferred aspect of the present invention. The beam splitter 36 splits a portion of the optical communications signal into a wavefront sensor 38, coupled to a wavefront analyzer and actuator circuitry 40, allowing control over the deformable mirror 34 in a feedback loop circuit. The wavefront analyzer and actuator circuitry 40 controls deformation of the deformable mirror 34 and restores a more uniform (or less distorted) wavefront as a corrected wavefront to be presented to a telescope lens or optics 42 and beam processing optics 44.

The corrected optical communications signal is passed into the beam processing optics 44, and in some instances, depending on design, a demultiplexer (multiplexer/demultiplexer) 46 using single mode fiber to collect the beam at the beam processing optics. Optical detectors can convert the optical signals into the appropriate signals.

The demultiplexer 46 demultiplexes the signal into a plurality of receivers 48 and for separate processing of separate, received signals in a signal processor 49. This can be followed by transmission of signals using the same or other optics and a laser for generating the optical communications signal with a transmitter having a beam generation function 49a, including optics, circuitry and laser. It is also possible to use within or with these described components a modified form of the optical amplifiers and components such as disclosed in commonly assigned U.S. Pat. No. 6,542,277, and published patent applications 2002/0071159 and 2003/0081880, the disclosures which are hereby incorporated by reference in their entirety.

In one aspect of the present invention, a separate laser 50 can generate a laser beam as a point source of light to be used as a reference beacon. This laser beam light or beacon can be used to aid in determining distortions within the wavefront of the optical communications signal 40.

The optical communications signal as it is split from the dichroic beam splitter 36 is analyzed by the wavefront analyzer and actuator circuitry 40 and commands are sent to actuators at the deformable mirror that change the surface of the deformable mirror and provide necessary compensations to the optical communications signal. Updating of the deformable mirror can occur at several hundred/thousand times per second or more depending on the type of system. The type of wavefront sensor can vary depending on the system selected by those skilled in the art. One type could use a fast CCD camera with various charge coupled devices positioned across the surface.

Different types of deformable mirrors can be used and can include a thin glass mirror with a discrete axial piezoelectric actuators that produce local displacement; a bimorph mirror with sheets of piezoelectric material bonded to a thin mirror to control the local curvature; a membrane mirror with a metal membrane whose global curvature is controlled by electrostatic forces; and a segmented mirror with an array of rigid mirrors with tip, tilt and piston actuators, as non-limiting examples.

The deformable mirror could include an anti-reflection coating with cables leading to various PZT or PMN actuators that get longer or shorter as voltage is changed. Liquid crystal devices could possibly be used where a voltage is applied to the back of each pixel and change the index of refraction locally. Microelectromechanical (MEMS) devices could be used as actuators. Some mirrors could be formed as a continuous mirror with an electrostatically actuated diaphragm, attachment posts and a membrane mirror.

As described before, dense wavelength division multiplexing (DWDM) is preferably used with the present invention to increase the capacity of the embedded fiber by assigning incoming optical signals to specific frequencies within a designated frequency band. These signals are multiplexed into one optical fiber, which preferably is a single mode fiber. The interface is bit rate and format independent and incoming signals are not terminated at an optical layer. Thus, the DWDM technology can coexist with existing equipment and gain access to the capacity of optical fiber. It can also reduce the costly multiplexing and demultiplexing functions and reuse existing optical signals.

As described before, the transmission chain of the satellite could use the same or another set of adaptive optics and a common multiplexer/demultiplexer, as illustrated, or a separate multiplexer for different optical communication signals that are multiplexed into one dense wavelength division multiplexed optical communications signal. It is possible to use adaptive optics even on the transmission side for adjusting the transmission of the optical communications. By compensating at the transmission side, it is possible to precompensate for wavefront distortion of the optical communication signals transmitted by the transmitter portion of a transceiver. The adaptive optics would be incorporated similarly into the ground station. The transmitted signal should go through the same optics 44, 42, 36, 34, and 32 of the received signal. This can be implemented by using an optical circulator in the single mode fiber between 44 and 46. The circulator has three ports: one port connects to 44, one port to 46, and the last port to the transmitter. Signals entering the circulator 44 are routed by the circulator to its port connecting to 46. Signals entering the circulator from the transmitter are routed to the port connected to 44. Another method of introduction the transmitted signal is to insert a polarizer (it would in the beam between 36 and 42 looking like 36 but tilted to defect a beam coming from the top of the page).

Although some adaptive optics have been used for free-space terrestrial communications, the present invention advantageously incorporates adaptive optics into the satellite and ground station communications with preferred DWDM and single mode optical fiber collection. The use of a single mode optical fiber is advantageous and allows the use of dense wavelength division multiplexed signaling where multiple channels can operate at different frequencies. The data capacity increased by assigning incoming optical signals to specific frequencies within a designated frequency band and have the signals multiplexed out onto the one single mode optical fiber.

Figure 3:
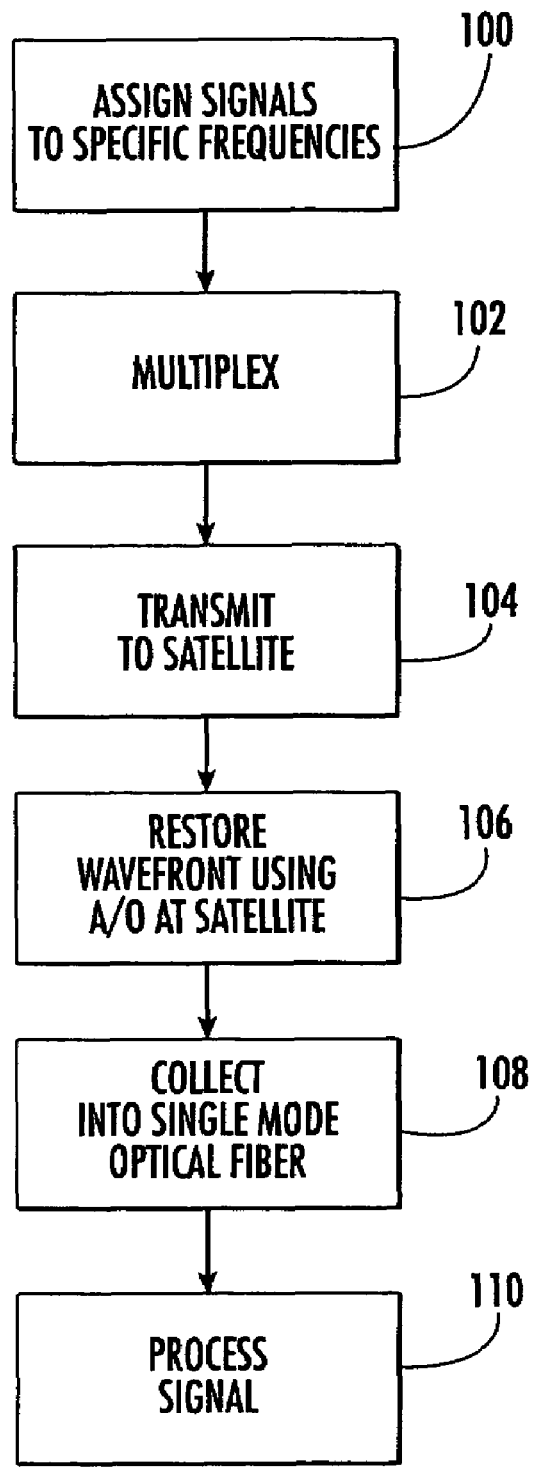
FIG. 3 is a flow chart illustrating an example of the method of the present invention.

FIG. 3 illustrates a flow chart as a non-limiting example of the method of the present invention and showing a ground-to-satellite communication. A number of optical signals as optical communication signals are assigned to specific frequencies within a designated frequency band (block 100) and multiplexed into a single fiber as a dense wavelength division multiplexed signal (block 102). The optical communications signal is transmitted from the ground station to receiver optics positioned within the satellite (block 104). The shape of any distortions in the wavefront of the optical communications signal received within the receiver optics is determined and the receiver optics adjusted to restore a more uniform wavefront to the optical communications signal (block 106). The optical communications signal is collected into a single mode optical fiber (block 108) and processed, such as demultiplexing and other optical and signal detection (block 110).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system of free-space optical satellite communications comprising:

a ground station including a transceiver for transmitting and receiving an optical communications signal, including adaptive optics at the ground station and operative with the transceiver for determining the shape of any distortions in the wavefront of the optical communications signal and compensating at the ground station for the distortions;

a satellite including a transceiver for transmitting and receiving the optical communications signal, including adaptive optics at the satellite for determining the shape of any distortions in the waveform of the optical communications signal and compensating at the satellite for the distortions and comprising a deformable adaptive mirror;

said satellite further comprising a beam splitter connected to said deformable adaptive mirror for receiving an optical communications signal from the deformable adaptive mirror and splitting a received optical communications signal into first and second paths;

beam processing optics, a multiplexer/demultiplexer and single mode fiber connecting the beam processing optics and the multiplexer/demultiplexer within the first path for multiplexing and demultiplexing dense wavelength division multiplexed (DWDM) signals;

an optical circulator within said single mode fiber for passing DWDM signals from a transmitter of said transceiver to the beam processing optics and passing DWDM signals from the beam processing optics into a receiver of said transceiver, and a multiplexer/demultiplexer for receipt or transmission of optical communications signals and wherein said multiplexer/demultiplexer is directly connected to said single mode fiber and said multiplexer/demultiplexer includes a demultiplexer that divides the DWDM optical communications signal into separate optical communications signals of different wavelengths, and a plurality of fixed, dedicated receivers that receive the optical communications signals at selected different wavelengths; and a wavefront sensor and analyzer and actuator circuit connected to said beam splitter and receiving signals therefrom in the second path and analyzing said signals and controlling in a feedback loop the deformable adaptive mirror and controlling and obtaining information from a reference beacon that determines distortions within the wavefront.

2. A system according to claim 1 wherein each of said adaptive optics at the ground station and at the satellite comprises a circuit operative with said deformable adaptive mirror for deforming a deformable adaptive mirror based on distortions determined in the wavefront of the optical communications signal.

3. A system according to claim 1 and further comprising a laser for generating a laser beam and creating an artificial point to aid in determining distortions within the wavefront of the optical communications signal.

4. A system according to claim 1 and further comprising a wavelength division multiplexer positioned at each of said ground station and satellite for wavelength division multiplexing the optical communications signal.

5. A system according to claim 4 wherein said multiplexer is operative for assigning incoming optical communications signals to specific frequencies within a designated frequency band.

6. A system according to claim 1 wherein said transceiver within each of said ground station and satellite is operative of adjusting the transmission of the optical communications signal.

7. A system of free-space optical satellite communications comprising:
- a ground station including a transmitter for transmitting an optical communications signal to a satellite;
- a satellite including a transceiver having a receiver and transmitter for receiving the optical communications signal, including adaptive optics at the satellite for determining the shape of any distortions in the wavefront of the received optical communications signal and compensating at the satellite for the distortions and comprising a deformable optical mirror;
- said satellite further comprising a beam splitter connected to said deformable adaptive mirror for receiving an optical communications signal from the deformable adaptive mirror and splitting a received optical communications signal into first and second paths;
- beam processing optics, a multiplexer/demultiplexer and single mode fiber connecting the beam processing optics and the multiplexer/demultiplexer within the first path for multiplexing and demultiplexing dense wavelength division multiplexed (DWDM) signals;
- an optical circulator within said single mode fiber for passing DWDM signals from a transmitter of said transceiver to the beam processing optics and passing DWDM signals from the beam processing optics into a receiver of said transceiver, and a multiplexer/demultiplexer for receipt or transmission of optical communications signals and wherein said multiplexer/demultiplexer is directly connected to said single mode fiber and said multiplexer/demultiplexer includes a demultiplexer that divides the DWDM optical communications signal into separate optical communications signals of different wavelengths, and a plurality of fixed, dedicated receivers that receive the optical communications signals at selected different wavelengths; and
- a wavefront sensor and analyzer and actuator circuit connected to said beam splitter and receiving signals therefrom in the second path and analyzing said signals and controlling in a feedback loop the deformable adaptive mirror and controlling and obtaining information from a reference beacon that determines distortions within the wavefront.

8. A system according to claim 7 and further comprising a circuit operative for deforming the deformable adaptive mirror based on distortions determined in the wavefront of the received optical communications signal.

9. A system according to claim 7 and further comprising a laser on the satellite for generating a laser beam and creating an artificial point to aid in determining distortions within the wavefront of the received optical communications signal.

10. A system according to claim 7 and further comprising a wavelength division multiplexer positioned at said ground station for wavelength division multiplexing the optical communications signal.

11. A system according to claim 10 wherein said multiplexer at the ground station is operative for assigning incoming optical communications signals to specific frequencies within a designated frequency band.

12. A system according to claim 7 and further comprising adaptive optics at said ground station operative with the transmitter, wherein said adaptive optics is operative for adjusting the transmission of the optical communications signal.

13. A method of free-space optical satellite communications comprising the steps of:
- transmitting an optical communications signal from a ground station to receiver optics positioned within the satellite;
- determining the shape of any distortions in the wavefront of the optical communications signal received within the receiver optics using a deformable adaptive mirror;
- adjusting the deformable adaptive mirror to restore a more uniform wavefront to the optical communications signal;
- receiving the optical communications signal from the deformable adaptive mirror and splitting a received optical communications signal into first and second paths using a beam splitter connected to the deformable adaptive mirror within the satellite while;
- multiplexing and demultiplexing dense wavelength division multiplexed (DWDM) signals within a multiplexer/demultiplexer that is connected to a single mode fiber connecting between beam processing optics and the multiplexer/demultiplexer within the first path;
- passing signals through an optical circulator within the single mode fiber for passing DWDM signals from a transmitter and passing DWDM signals into a receiver, and the multiplexer/demultiplexer for receipt or transmission of optical communications signals and wherein said multiplexer/demultiplexer is directly connected to said single mode fiber and said multiplexer/demultiplexer includes a demultiplexer that divides the DWDM optical communications signal into separate optical communications signals of different wavelengths, and a plurality of fixed, dedicated receivers that receive the optical communications signals at selected different wavelengths; and
- receiving signals within a wavefront sensor and analyzer and actuator circuit connected to the beam splitter and receiving signals therefrom in the second path and analyzing the signals and controlling in a feedback loop the deformable adaptive mirror and controlling and obtaining information from a reference beacon that determines distortions within the wavefront.

14. A method according to claim 13 and further comprising the step of deforming optics within the deformable adaptive mirror to restore a less distorted wavefront.

15. A method according to claim 13 and further comprising the step of generating a laser beam for creating an artificial point to aid in determining distortions within the wavefront of the optical communications signal.

16. A method according to claim 13 and further comprising the step of wavelength division multiplexing the optical communications signal.

17. A method according to claim 13 and further comprising the step of adjusting the transmission of the optical communications signal from the ground station to account for wavefront distortion as the optical communications signal passes through the atmosphere between the satellite and ground station.

* * * * *